Nov. 21, 1961  J. P. KOPSKI ET AL  3,009,850
GLASS ROLLING APPARATUS

Filed Jan. 14, 1959  2 Sheets-Sheet 1

INVENTORS.
J. P. KOPSKI
L. H. SCHMIDT
E. C. McRae
J. H. Oster
J. J. Roethel
BY  Attorneys

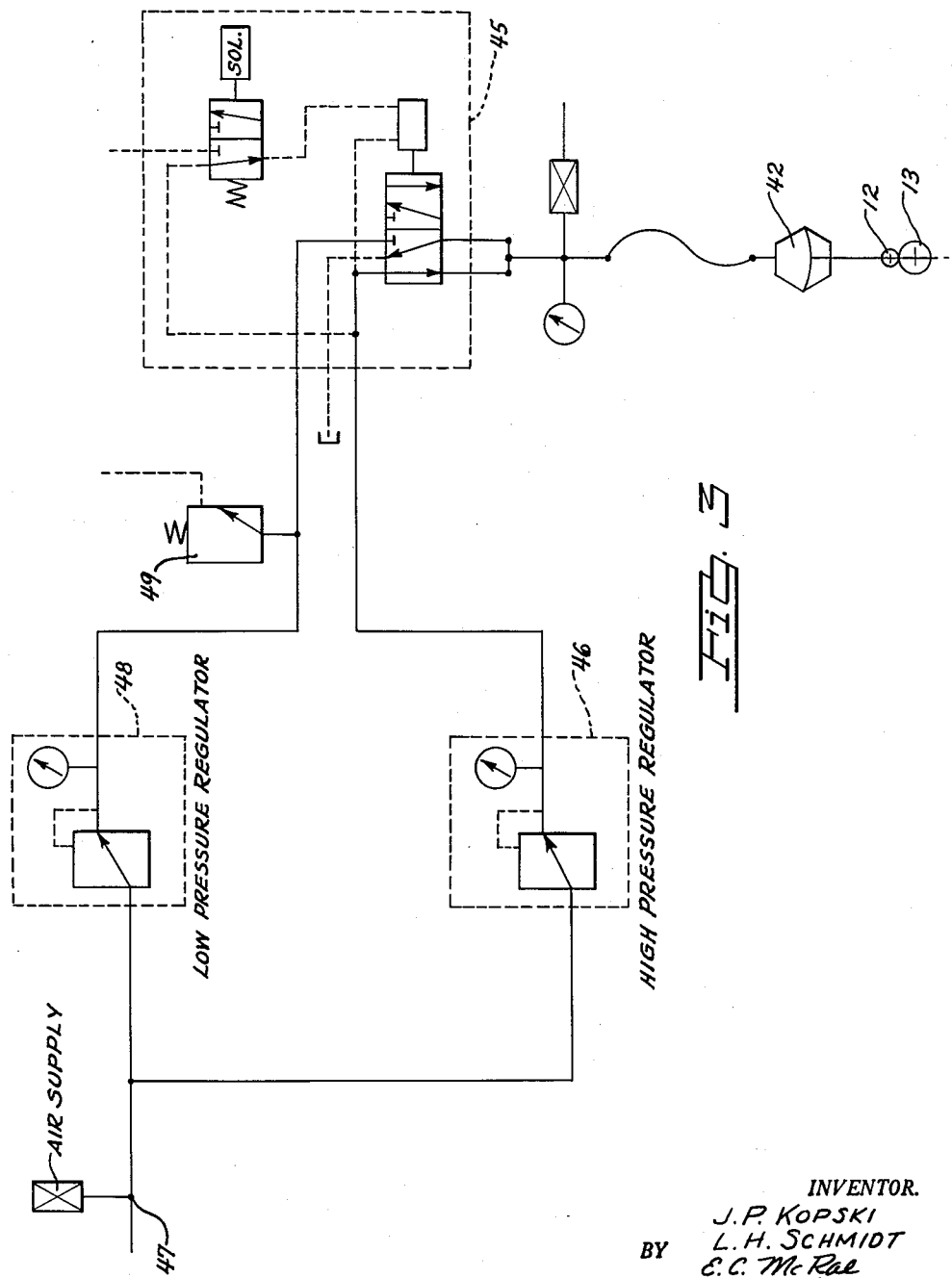

3,009,850
GLASS ROLLING APPARATUS
Joseph P. Kopski and Lloyd H. Schmidt, Nashville, Tenn., assignors to Ford Motor Company, Dearborn, Mich., a corporation of Delaware
Filed Jan. 14, 1959, Ser. No. 786,850
11 Claims. (Cl. 156—99)

This invention relates to the production of laminated safety glass and more particularly to an apparatus for applying pressure to two curved sheets of glass having a sheet of plastic material interposed therebetween, as is used in the production of laminated automobile windshields.

The conventional production of laminated safety glass involves the insertion of a lamina of sheet plastic material, such as polyvinyl butyral, between two sheets of glass. The raw sandwich, so formed, is then subjected to de-airing and tacking processes. Generally, the raw sandwich is twice passed through squeeze rolls adapted to apply a nipping or squeeze type pressure starting at one end of the sandwich and progressively passing down the length of the sandwich to the other end. The first or de-airing pass has as its objective the elimination of all air pockets between the layers. The second or tacking pass has as its objective the adhesion of the vinyl plastic to the sheets of glass. Before being passed through the rolls for the tacking operation, the de-aired sandwich is heated to a sufficient temperature to render the vinyl plastic tacky. After the second or tacking pass through the rollers, the windshield is said to be prepressed and is ready for immersion in the heated oil of an autoclave to render the sandwich transparent.

If, for any reason, the tacking or adhesion of the vinyl plastic interlayer to the glass sheets is imperfect, the oil of the autoclave will penetrate between the layers. The problem of the pentration of the oil between the glass sheets is particularly troublesome in the areas of the wing tips of the windshields, especially in the area of the trailing wing tip. This is due to the fact that during the rolling operation, the two pieces of glass shift under pressure of the rolls as they are nesting. When the two pieces shift, the vinyl has a tendency to wrinkle in the wing tip providing openings through which the oil is able to penetrate.

In the early stages of the development of laminated curved windshields, constant pressure was applied to the windshield through the rollers by mechanical means. A glass rolling apparatus having such mechanical means is disclosed in U.S. Patent No. 2,729,581. Later improvements to this apparatus were made by adding a diaphragm regulator which gave a better adjustment of the roller pressure. However, the theory of operation was still based on the application of the constant pressure to the windshield as it passed through the rolls. The present invention relates to an improved apparatus embodying means for varying the pressure applied by the rollers to the various portions of the windshield as the latter passes between the rollers. More particularly, the present invention embodies means for applying a high pressure to the leading wing tip of the windshield as the latter enters between the rollers. Upon the relative movement between the rollers being such that the rollers leave the wing tip area and enter the body or center section of the windshield, a control means is actuated causing the pressure to be changed from a high value to a low value. The low pressure is maintained until the trailing wing tip of the windshield enters between the rollers at which time the pressure is again changed to a high value. It is an important feature of the present invention that the pressure applied to the body or center section of the windshield be relatively low. This is necessary to prevent the breaking of the windshild as it passes through the rollers, the body or center section of the windshield being subject to the greatest sag or deviation from the normal roll contour.

Other objects, advantages and features of the present invention will be made more apparent as this description proceeds, particularly when considered in connection with the accompanying drawings, wherein:

FIG. 3 is a schematic diagram of the system for controlling application of air pressure to the rolls.

Figure 1:
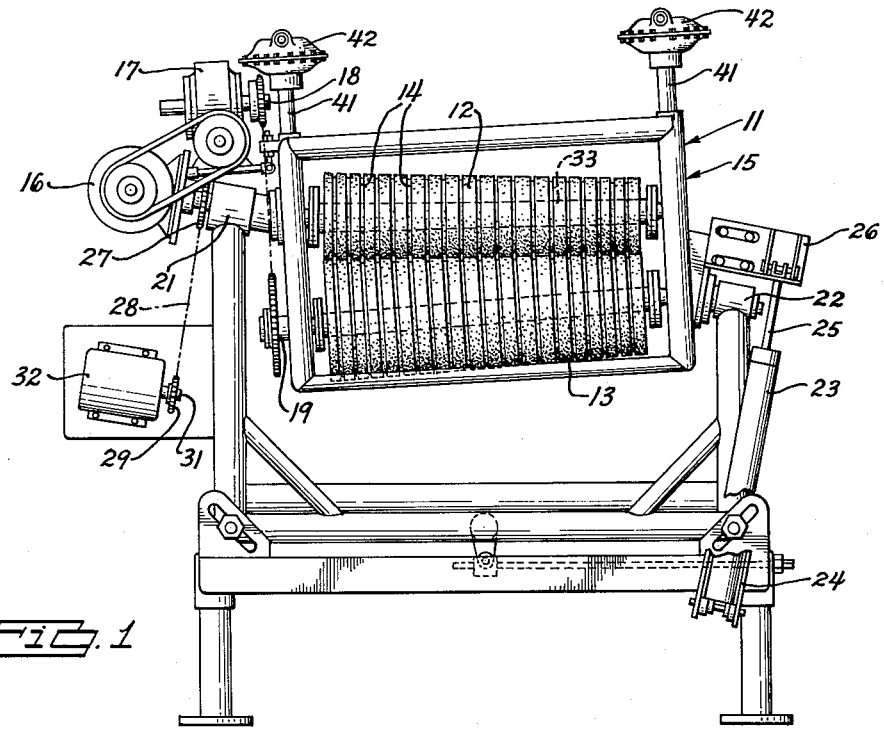
FIG. 1 is an elevation of the glass rolling apparatus.

Referring now to FIG. 1, there is illustrated a glass rolling apparatus, generally designated 11, substantially similar to that shown in the above-mentioned U.S. Patent No. 2,729,581. As described with respect to this apparatus, the actual rolling of the glass sandwich is done between an upper roll 12 and a lower roll 13, each of which are preferably provided with peripheral grooves 14. These rolls are cradled in a quadrilateral frame structure 15 and are free to rotate therein. It will be observed that the lower roll 13 is greater in diameter than the upper roll 12 and that neither roll is cylindrical, but that each roll tapers, becoming smaller from left to right, as seen in FIG. 1.

The lower roll 13 is driven by a motor 16 which is operatively associated with a gear reduction unit 17 through a conventional belt and pulley arrangement. The output shaft 18 of the gear reduction unit is drivingly connected to the lower roller support shaft 19 through a conventional chain and sprocket system. The upper roll 12 is driven only by frictional contact against the lower roll 13 and the glass passing therebetween.

It will be observed that quadrilateral frame 15 is free to tilt in journals 21 and 22. The axis upon which the quadrilateral frame 15 tilts makes an angle of about 10° with the horizontal.

In the apparatus illustrated, the quadrilateral frame 15 is tilted about its pivot axis through intermittent manual or mechanical operation. The mechanical operation may be through the use of an air cylinder 23 which is illustrated as being pivotally connected to a yoke or bracket 24 secured to the base of the apparatus. The free end of the air cylinder piston rod 25 is pivotally connected to a yoke or a bracket 26 secured to the quadrilateral frame 15. Actuation of the air cylinder is controlled in a conventional manner by the operation of suitable air valves. Whether the frame is manually or mechanically tilted, it is necessary that the operator attempt to maintain the plane containing the longitudinal axes of the two rollers normal to the surface of the glass sandwich as the latter passes therebetween.

It will be noted that the journal 21 of the quadrilateral frame 15 is provided with a sprocket 27 which is coupled by a drive chain 28 to a sprocket 29 mounted on a shaft 31 projecting from a small housing 32. The housing 32 contains a conventional cam operated switch (not shown) for a purpose to be hereinafter explained.

Figure 2:
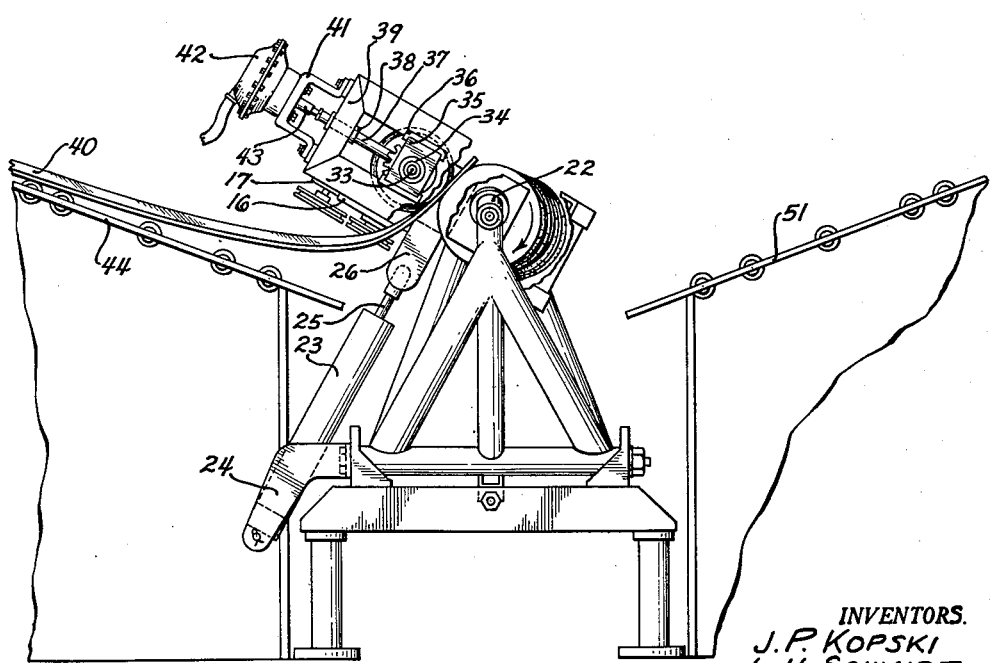
FIG. 2 is a right end view of the glass rolling apparatus as seen in FIG. 1.

With particular reference to FIG. 2, each end of the shaft 33 journaling the upper roller 12 is supported in a bearing 34 which, in turn, is carried in a slide block 35. Each slide block 35 is grooved on its lateral edges and is adapted to be guided for vertical sliding movement on slide ways or bars 36 secured to the quadrilateral frame members. By means of the movable mounting of each of the ends of the upper roller 12, the latter is movable toward or from the lower roller 13. In the structure disclosed in the above mentioned patent the positioning of the ends of the upper roller 12 and thereby the pressure exerted by this roller on the lower roller 13, was obtained through a screw type mechanism. This, of course, meant that the adjustment of the pressure to the desired value depended on a slow manipulation of the screw device. And, it was not possible to vary the pressure during the operating cycle. In the present embodiment, the adjusting means acting on each end of the roller comprises a vertical shaft 37 coupled at its lower end to a slide block 35. The shaft 37 projects through a suitable bushing or bearing device 38 in a side upper member 39 of the quadrilateral frame 15. Each upper member 39 of the quadrilateral frame 15 is provided with a U-shaped bracket 41 supporting a diaphragm type pressure regulator 42. The upper end of each shaft 37 is threadedly and adjustably connected to the projecting member 43 of the respective pressure regulator 42.

In operation, the windshield 40 is positioned with respect to the tacking apparatus on an inclined conveyor 44. As the windshield enters between the rollers 12 and 13, the cam switch is in an open position. The solenoid valve 45, which is a two-pressure type, is de-energized. In this condition the air pressure to the diaphragm pressure regulators is from the high pressure regulator 46 side of the air circuit. It should be pointed out that the air control circuit illustrated in FIG. 3 represents only half the system, the system being symmetrical about the point 47. In a prototype structure, the pressure of the high pressure air was approximately 80 p.s.i. When the tacking rollers 12 and 13 leave the wing tip, or with reference to FIG. 2, pass around the corner of the windshield, the frame 15 will have been tilted sufficiently to cause actuation of the cam switch so that the latter will close. The closing of the cam switch results in the solenoid valve 45 being energized to close the circuit to the high pressure side and limiting the pressure acting on the pressure regulators 42 to that through the low pressure regulator 48. This low pressure may be in the range of 18 to 30 pounds per square inch. The high pressure in the system is relieved through a pressure relief valve 49 set at predetermined low pressure setting.

As was stated above, the purpose in lowering the pressure from 80 pounds to the low pressure of 18 to 30 pounds is to prevent the breaking of the windshield in the body or center section, where the greatest sag results in the greatest deviation from roll contour. During the time the windshield body or center section is being pressed, the quadrilateral frame 15 will be held by the operator in a substantially vertical position. Upon the trailing wing tip area being reached, the operator will of necessity further swing the frame in a clockwise direction as viewed in FIG. 2 in order to maintain the vertical plane through the axes of the rollers normal to the plane of the glass and, by so doing, will cause further turning movement of the cam switcch shaft 31. The cam switch is thus caused to open, de-energizing the solenoid valve 45 which changes the pressure from low pressure (18 to 30 p.s.i.) to high pressure (75 to 80 p.s.i.). After the windshield 43 exits from the tacking rollers to the discharge conveyor 51, the quadrilateral frame 15 is returned to its initial starting position ready to receive the next windshield. During the return cycle the solenoid valve 45 remains de-energized holding the system at high presure in readiness to receive the leading wing tip of the next windshield.

It has been found that the operation of the tacking apparatus at a relatively high pressure during the time the wing tip areas pass between the rolls has resulted in a much more tightly sealed windshield. Thus, the number of windshields rejected because of oil penetration between the glass sheets has been greatly reduced. The relatively low pressure used on the body or center section of the windshields has resulted in a much lower breakage loss.

It will be understood that the invention is not to be limited to the exact construction shown and described, but that various changes and modifications may be made without departing from the spirit and scope of the invention, as defined in the appended claims.

What is claimed is:

1. A glass rolling apparatus comprising a frame, a pair of elastomer rolls, means rotatably supporting said rolls in said frame, the means supporting at least one of said rolls being slidable relative to said frame, pressure operated means coupled to said one roll for moving the same relative to the other roller to vary the distance between the axes of rotation thereof, control means effective to operate said pressure operated means to cause said relative roll movement, and means supporting said frame for tilting movement so that the application of pressure by said rolls may be maintained in a direction substantially normal to the plane of a glass sandwich passing therebetween, said control means being responsive to the angle of tilt of said frame.

2. A glass rolling apparatus comprising a frame, a pair of elastomer rolls, means rotatably supporting said rolls in said frame, the means supporting at least one of said rolls being slidable relative to said frame, pressure operated means coupled to said one roll for moving the same relative to the other roll to vary the distance between the axes of rotation thereof, control means effective to operate said pressure operated means to cause said relative roll movement, means supporting said frame for tilting movement so that the application of pressure by said rolls may be maintained in a direction substantially normal to the plane of a glass sandwich passing therebetween, said control means being responsive to the angle of tilt of said frame, and means rotatably driving at least one of said rolls.

3. A glass rolling apparatus for applying pressure to a glass lamina comprising two curved sheets of glass having a sheet of plastic material interposed therebetween, said curved sheets having relatively sharply curved wing tips at each end of a center section, said apparatus comprising a frame, means supporting said frame for tilting movement, means supporting said rolls in said frame, the means supporting at least one of said rolls being slidable in said frame to permit the center distance between said rolls to be varied thereby to vary the pressure on sheets passing therebetween, pressure operated means coupled to said one roll for moving the one relative to the other, and control means effective to operate said pressure operated means, said control means being responsive to the angle of tilt of said frame so that the greatest pressure is applied to said sheets when said frame is at its greatest angle of tilt, the latter occurring as said wing tips pass between said rolls.

4. A glass rolling apparatus for applying pressure to a glass lamina comprising two curved sheets of glass having a sheet of plastic material interposed therebetween, said curved sheets having relatively sharply curved wing tips at each end of a center section, said apparatus comprising a frame, means supporting said frame for tilting movement, means supporting said rolls in said frame, the means supporting at least one of said rolls being slidable in said frame to permit the center distance between said rolls to be varied thereby to vary the pressure on sheets passing therebetween, pressure operated means coupled to said one roll for moving the one relative to the other, control means effective to operate said pressure operated means, said control means being responsive to the angle of tilt of said frame so that the greatest pressure is applied to said sheets when said frame is at its greatest angle of tilt, the latter occurring as said wing tips pass between said rolls, and means rotatably driving at least one of said rolls.

5. In a glass rolling apparatus for applying pressure to a lamina comprising comprising two curved sheets of glass having a sheet of plastic material interposed therebetween, said curved sheets terminating in sharply curved wing tips, a tiltable frame, a pair of opposed elastomer rolls rotatably supported in said frame, means adapted to tilt said frame to maintain a plane containing the axes of rotation of said rolls substantially normal to the surface of said glass sheets as they pass between said rolls, the angle of tilt of said frame being greatest as the wing tip areas of said sheets pass between said rolls, and means for varying the pressure exerted by said rolls, said means being responsive to the tilting movement of said frame so that the pressure applied is greatest at the maximum angle of frame tilt.

6. The method of applying pressure to prepress a lamina comprising two sheets of curved glass having a sheet of plastic interposed therebetween, said curved sheets terminating in sharply curved wing tips, comprising applying of rolling pressure to opposite sides of said lamina, maintaining the line of pressure application normal to the surfaces of said lamina, and varying the pressure from a relatively high pressure applied to the wing tips to a relatively low pressure to the section therebetween.

7. The method of applying pressure to prepress a lamina comprising two sheets of curved glass having a sheet of plastic interposed therebetween, said curved sheets terminating in sharply curved wing tips, comprising passing the lamina between a pair of opposed pressure applying rolls, the direction of pressure application being first over one wing tip, then over the section between said wing tips, and then over the trailing wing tip, and varying the pressure from a relatively high pressure applied to the wing tips to a relatively low pressure to the section therebetween.

8. The method of applying pressure to prepress a lamina comprising two sheets of curved glass having a sheet of plastic interposed therebetween, said curved sheets terminating in sharply curved wing tips, comprising passing the lamina between a pair of opposed pressure applying rolls, the direction of pressure application being first over one wing tip, then over the section between said wing tips, and then over the trailing wing tip, maintaining the line of pressure normal to the surfaces of the lamina, and varying the pressure from a relatively high pressure applied to the wing tips to a relatively low pressure to the section therebetween.

9. The method of applying pressure to prepress a lamina comprising two sheets of curved glass having a sheet of plastic interposed therebetween, said curved sheets terminating in sharply curved wing tips, comprising applying of rolling pressure to opposite sides of said lamina, maintaining the line of pressure application normal to the surfaces of said lamina, and varying the pressure from a maximum of 75 to 80 p.s.i. over the wing tip areas to a minimum of 18 to 30 p.s.i. over the area therebetween.

10. The method of applying pressure to prepress a lamina comprising two sheets of curved glass having a sheet of plastic interposed therebetween, said curved sheets terminating in sharply curved wing tips, comprising passing the lamina between a pair of opposed pressure applying rolls, the direction of pressure application being first over one wing tip, then over the section between said wing tips, and then over the trailing wing tip, and varying the pressure from a maximum of 75 to 80 p.s.i. over the wing tip areas to a minimum of 18 to 30 p.s.i. over the area therebetween.

11. The method of applying pressure to prepress a lamina comprising two sheets of curved glass having a sheet of plastic interposed therebetween, said curved sheets terminating in sharply curved wing tips, comprising passing the lamina between a pair of opposed pressure applying rolls, the direction of pressure application being first over one wing tip, then over the section between said wing tips, and then over the trailing wing tip, and maintaining the line of pressure normal to the surfaces of the lamina, and varying the pressure from a maximum of 75 to 80 p.s.i. over the wing tip areas to a minimum of 18 to 30 p.s.i. over the area therebetween.

References Cited in the file of this patent

UNITED STATES PATENTS

| | | |
|---|---|---|
| 1,334,588 | Bartelstone | Mar. 23, 1920 |
| 2,729,581 | Pascoe et al. | Jan. 3, 1956 |
| 2,825,671 | Langhart et al. | Mar. 4, 1958 |

UNITED STATES PATENT OFFICE

CERTIFICATE OF CORRECTION

Patent No. 3,009,850                                          November 21, 1961

Joseph P. Kopski et al.

It is hereby certified that error appears in the above numbered patent requiring correction and that the said Letters Patent should read as corrected below.

Column 4, line 7, for "roller" read -- roll --; line 68, strike out "comprising", second occurrence.

Signed and sealed this 10th day of April 1962.

(SEAL)
Attest:

ERNEST W. SWIDER
Attesting Officer

DAVID L. LADD
Commissioner of Patents